United States Patent [19] [11] Patent Number: 4,686,515
Anderson et al. [45] Date of Patent: Aug. 11, 1987

[54] APPARATUS AND METHOD FOR MARKER VERIFICATION

[75] Inventors: Philip M. Anderson, Madison; Richard C. Ujazdowski, Flemington; Jeffrey C. Urbanski, Sparta, all of N.J.

[73] Assignee: Allied Corporation, Morris Township, Morris County, N.J.

[21] Appl. No.: 727,305

[22] Filed: Apr. 25, 1985

Related U.S. Application Data

[63] Continuation-in-part of Ser. No. 700,256, Feb. 11, 1985.

[51] Int. Cl.$^4$ .......................... G08B 13/14; G07D 7/00
[52] U.S. Cl. .................................... 340/572; 235/380; 340/825.34
[58] Field of Search ...................... 340/825.34, 825.31, 340/572, 551; 235/380, 382, 382.5, 493–495; 283/82; 356/71; 382/1–2; 178/22.08

[56] References Cited

U.S. PATENT DOCUMENTS 4,489,318 12/1984 Goldman ..................... 340/825.34
4,510,490  4/1985 Anderson, III et al. ........... 340/572
4,558,175 12/1985 Genest et al. ............... 340/825.34 X
4,578,567  3/1986 Granzow et al. ................... 235/380

Primary Examiner—Glen R. Swann, III
Assistant Examiner—Thomas J. Mullen, Jr.
Attorney, Agent, or Firm—Ernest D. Buff; Gerhard H. Fuchs

[57] ABSTRACT

An apparatus and method are provided for product verification wherein a verification marker attached to the product produces a signal identified by a disguised scanning code and matched to a visible code indicia on the product. The signal from the marker is in response to a known applied interrogation field generated by a scanning unit. The scanning unit is portable and includes a detector for the response signal. An EPROM processes the response signal and generates the scanning code. The programming is such that the code is random and different for each manufacturer/product and corresponds to the visible code indicia. The marker includes an amorphous metal ribbon having a known magnetomechanical vibration characteristic.

8 Claims, 2 Drawing Figures

APPARATUS AND METHOD FOR MARKER VERIFICATION

CROSS-REFERENCE TO RELATED APPLICATIONS

This application is a continuation-in-part of copending application Ser. No. 700-256, filed Feb. 11, 1985, entitled "Apparatus and Method For Marker Verification."

TECHNICAL FIELD

This invention relates generally to product verification systems, and more particularly, to a verification apparatus and method wherein the code to be derived from a tag or the like is disguised to foil potential counterfeiters, but the tag, and thus the goods, is readily interpreted as authentic by an authorized person.

BACKGROUND OF THE INVENTION

A recent study by the U.S. International Trade Commission indicates that the counterfeiting of name brand goods is presently costing American businesses up to $8 billion in lost sales annually. In addition, the counterfeiting is effectively costing the work force some 131,000 jobs per year. Still more startling is the fact that the counterfeiting menace is increasing. The growth of counterfeiting, however, should be easy to understand when the huge profits obtainable by the counterfeiter on the sale of low quality, bogus goods at name brand prices are considered.

In order to combat the counterfeiting problem, technologies have been developed for placing an identifiable marker or tag on the name brand goods. Of course, the markers themselves must be made very difficult to counterfeit in order to be effective. Typically, the marking system is designed so that at least the cost of breaking the code and reproducing the marker or tag is prohibitive to the counterfeiter. However, on the other hand, the markers of the identifying system must be produced at a relatively low cost so as to make the concept economically feasible to the brand name manufacturer seeking to protect its products.

An example of a tagging or marking system is found in copending U.S. patent application Ser. No. 373,061, filed April 29, 1982, now U.S. Pat. No. 4,510,489 entitled "Surveillance System Having Magnetomechanical Marker" and assigned to Allied Corporation, the assignee of the present invention. The marker preferably includes an elongated, amorphous metal strip of ferromagnetic material adapted to be magnetically biased, and thereby armed to resonate mechanically, at a frequency within the frequency band of a magnetic interrogation field. Checking for authenticity is easily accomplished after exciting the strip with its natural resonant frequency by then electronically detecting the appropriate frequency.

One potential problem in providing an effective anti-counterfeiting system with this technology is the relatively limited number of available marker response frequencies. Thus, providing several companies with a relatively large number of coded markers to identify their different products while maintaining a distinctive response for each company and/or product has not been practical. In other words, in the past it was felt that the number of output codes from a reader was limited to the number of different marker ribbon frequencies available.

Furthermore, in the past it has not been feasible to place a visible coded indicia on the marker tag. The visible indicia would be useful in immediately indicating to the authorized person verifying the product that the proper output code is obtained. However, no effective system has been found heretofore to permit visible indicia display without jeopardizing the integrity of the system.

Thus, a need is identified for a simple and inexpensive means for disguising the marker response frequencies. Second, there is a need in the verification system wherein a visible code indicia may be attached to the product. Broadly, it is contemplated that by use of a programmable scanning unit and comparing the identifiable but disguised response signal of the marker to the visible indicia, the authentic product can be readily verified.

SUMMARY OF THE INVENTION

Accordingly, it is the object of the present invention to provide both an apparatus and method for a product verification system that is highly efficient in providing proper identification of goods.

It is another object to provide such an identification system where the marker response is disguised and a visible code may be used for verification.

It is another object to provide such an identification system wherein the scanning unit may be preprogrammed in order to give the distinctive signal display corresponding to the particular marker provided.

It is another object to provide such an identification system that can use a mass produced marker that is interchangeable between users, but when in combination with a preprogrammed scanning unit is unique, and thus effective for identification as to source.

Briefly stated, the apparatus of the invention thus includes a verification marker that is secured to the product to be protected. The marker, which can be either disposable or reusable, includes at least one ribbon of magnetostrictive, ferromagnetic material, preferably an amorphous metal ribbon with a magnetomechanical characteristic to vibrate at a known frequency. As discussed above, a marker of this type provides an identifiable signal in response to an applied magnetic interrogation field.

In addition, the apparatus includes a portable scanning unit similar to the unit fully set forth and disclosed in copending U.S. patent application Ser. No. 700-256, filed Feb. 11, 1985, entitled "Apparatus and Method for Marker Verification" and assigned to the assignee of the present invention. The scanning unit includes an antenna and an interrogation circuit for establishing a narrow magnetic field of varying frequency and short overall range. This interrogation field is used in energizing the closely coupled, properly oriented marker that is attached to the product to be protected. Specifically, the applied interrogation field sweeps through the resonant frequency that provides the marker with signal identity.

Means in the scanning unit are also provided for detecting and processing the resulting signal from the marker. Additionally, the scanning unit is provided with means, such as a liquid crystal display, for indicating a scanning code. The scanning code is preferably composed of random digits assigned with a known relationship to the response signal frequency of the marker.

Preferably, the scanning unit includes an EPROM programmable to produce selective scanning codes, one corresponding to each different manufacturer and/or product. Thus, a marker for a particular response frequency produces different scanning code depending on the programming of the EPROM in the matched scanning unit. This, advantageously, serves to disguise the individual marker response frequencies. Further, a visible code indicia is attached to the product. The indicia may, for example, be a series of digits printed on the marker.

When the scanning code is compared or matched to the visible code indicia on the marker, verification of the product is readily obtained. Each manufacturer is assigned a different random number for matching. Since the actual frequency of the marker is never disclosed, the system is not subject to ready detection by a counterfeiter. Since each manufacturer is supplied with its own programmed, and thus matched, scanning unit, the scanning code for each marker can be different although the actual magnetostrictive, ferromagnetic ribbon of the marker is identical.

From the above, it is clear that the product verification system of the present invention provides the potential for improved protection against counterfeiting. Supplying matched markers and scanning units allows wide use among different manufacturers with a relatively small number of markers with different response frequencies. The system provides for verification through a comparison of the visible code indicia attached to the product and the scanning code indicated by the scanning unit. Authenticity of the product is easily assured by checking and comparing the visible code indicia attached to the product and the indicated scanning code without having to refer to a separate listing of standard codes or the like; i.e. as long as there is a match, the product is verified as being authentic and not counterfeit.

The product verification system of the present invention provides an interactive concept that necessitates a prospective counterfeiter to acquire the complete system, including the scanning unit and marker, before there could even be an attempt at bypassing the system. Furthermore, since the amorphous metal ribbons are as a practical matter incapable of being reproduced due to the extreme casting parameters required, the verification system of the invention is very secure. The counterfeiting process for the amorphous metal ribbons is much more difficult than competitive systems and is cost prohibitive to the counterfeiter. Rather than making the effort and investing the resources to break the system, the counterfeiter simply avoids the products that are so protected.

BRIEF DESCRIPTION OF THE DRAWING

The invention will be more fully understood and further advantages will become apparent when reference is made to the following detailed description of the preferred embodiment of the invention and the accompanying in which.

DETAILED DESCRIPTION OF THE PREFERRED EMBODIMENT

Figure 1:
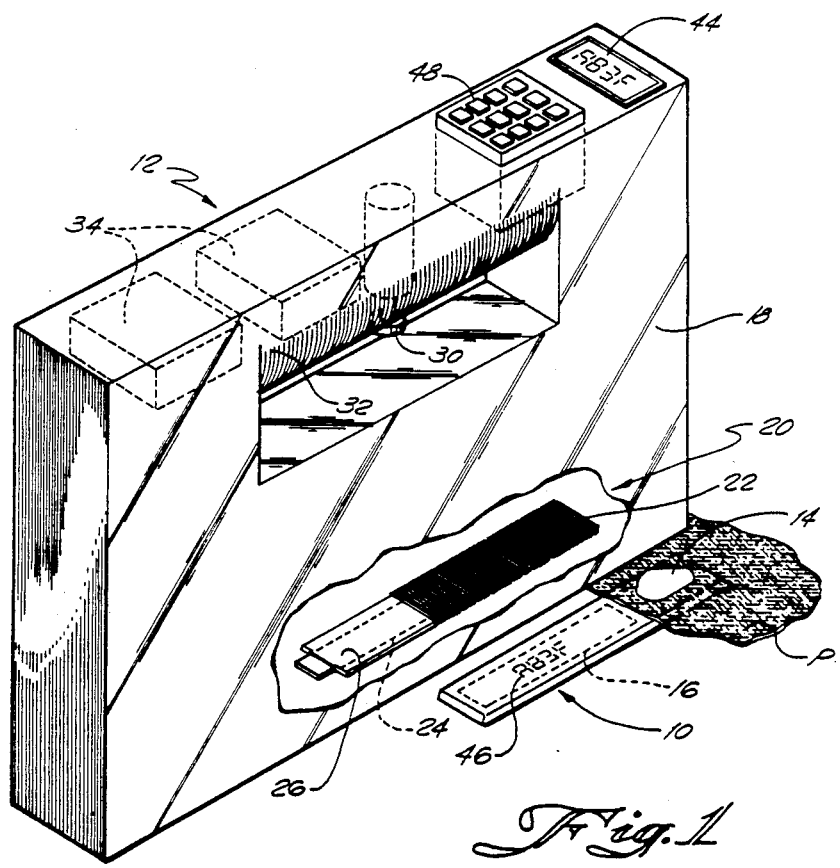
FIG. 1 is a perspective view of the scanning unit of the present invention shown positioned over a verification marker, including a visible code indicia, that is attached to a product to be protected.

Reference is now made to FIG. 1 showing the verification marker 10 and scanning unit 12 together forming the product verification system of the present invention. As shown, the marker 10 is attached to the goods or product P to be protected from counterfeiting such as, for example, by a detachable pin 14, as is known in the art. The marker 10 may include one or more elongated magnetomechanical ribbons 16. Each ribbon 16 is preferably a strip of magnetostrictive, amorphous metal adapted to be magnetically biased and thereby, armed to resonate mechanically at a standard or known frequency. The ribbon or ribbons 16 are positioned in the marker 10 so that each ribbon is unrestrained and undamped in order to be free to vibrate.

The matched scanning unit 12 includes a housing 18 containing an antenna adjacent the bottom of the housing, generally designated by reference numeral 20. Preferably, the antenna 20 is adapted to operate only over a relatively narrow zone and at a short overall range. An example of such an antenna is found in copending U.S. patent application Ser. No. 700,257, filed Feb. 11, 1985, now U.S. Pat. No. 4,658,263 entitled Dual Antenna for Magnetic Markers and incorporated herein by reference.

The antenna 20 includes a substantially flat drive coil 22 and an overlapping receive coil 24 having at least one loop. The individual windings or loops of the drive coil 22 and receive coil 24 are contained in planes substantially perpendicular to each other. Advantageously, transformer action is therefore small and electromagnetic noise is minimized.

When the drive coil 22 is energized to produce an interrogation frequency of electromagnetic radiation, most of the resulting magnetic field lines are concentrated inside the drive coil. A relatively weak magnetic field, however, is generated adjacent and along the outside of the drive coil 22. This field is capable of exciting a properly oriented and closely coupled marker 10 at a very short range (note position of the marker relative to the scanning antenna in FIG. 1).

Preferably, the scanning unit is also provided with biasing means, such as a ferromagnetic plate 26. The plate 26 has a high magnetic coercivity and provides a direct current (dc) bias field for activating the marker 10. As shown, the ferromagnetic plate 26 may be a template upon which the drive and receive coils 22, 24, respectively are wound.

Advantageously, the activation of the marker 10 through the establishment of a bias field originating from the scanning unit 12 eliminates the need for the inclusion of a biasing ferromagnetic element in each individual marker. Thus, the cost of manufacturing the individual markers 10 is greatly reduced.

When the dc bias field and scanned alternating current (ac) interrogation field are applied to the magnetostrictive ribbon 16 of the marker 10, energy is alternately stored and released with the frequency of the ac field. Magnetostrictive energy storage and release are maximal at the mechanical resonance frequency and minimal at the anti-resonance frequencies of the material. The energy storage and release induces a voltage in the receive coil 24 of the antenna 20 via flux density changes in the ribbon 16. The flux density change relates to an increase in the effective magnetic permeability of the ribbon 16 at the resonance frequency and a decrease at anti-resonance. This results in a directly proportional change in the magnetic coupling between the drive coil 22 and the receive coil 24.

Figure 2:
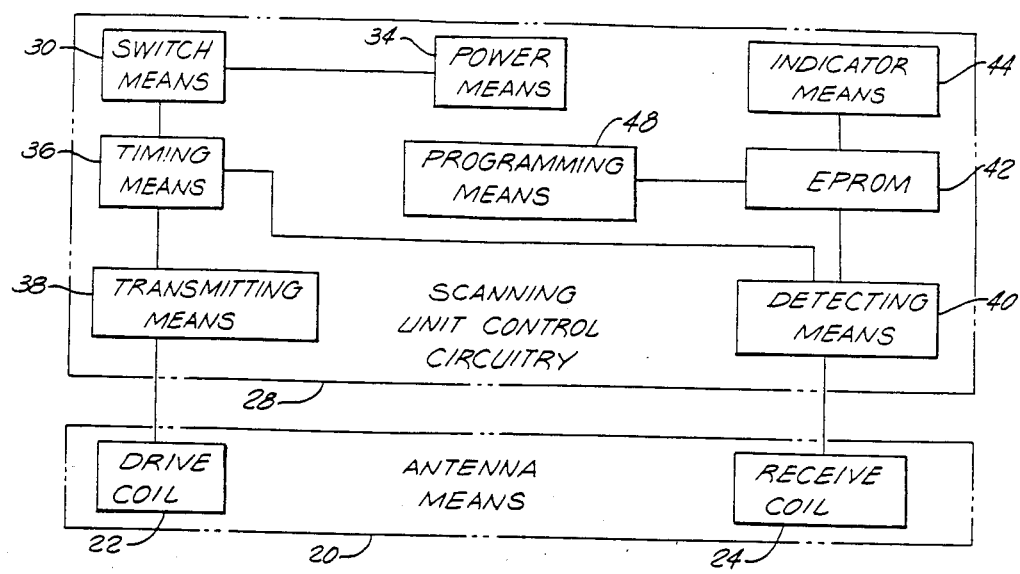
FIG. 2 is a schematic circuit diagram of the scanning unit forming a part of the product verification system of the present invention.

The scanning unit 12 is equipped with control circuitry 28, schematically shown in FIG. 2, for establishing the applied magnetic interrogation field and detecting and processing the marker response signal. The control circuitry 28 is triggered by a switch 30 on the handle 32 of the scanning unit 12. The closing of the switch 30 connects the power means, such as dry cell batteries 34, to the timing means 36.

The timing means 36 synchronizes the operation of transmitting means 38 and detecting means 40. The timing means 36 sends a gate pulse to the transmitting means 38 that includes a swept frequency oscillator and amplifier. Upon being activated, the swept frequency oscillator, set with its range of frequency including the frequency of the marker 10 employed to tag the product, drives the amplifier. The amplifier in turn activates the drive coil 22 for the duration of the gate pulse, such that an ac interrogation field is developed and applied to the closely coupled marker 10. The marker 10 is then excited and undergoes mechanical vibration at its resonance frequency; the vibration serving to induce a voltage in the receive coil 24.

Upon completion of the interrogating signal, the timing means 36 produces a gate pulse to the detecting means 40 for activation. In other words, the output signal of the receive coil 24 is now applied to the detecting means 40.

A narrow band pass filter may be utilized in the detecting means 40 having a center frequency following the drive signal. This system thus provides immunity to false signals, such as stray radiated or power line conducted sources. A false signal is highly unlikely with such a feature since the interference would have to occur at the resonant frequency and, in addition be synchronized with the swept frequency of the drive signal. The detecting means 40 also includes an integrator to integrate or average the signal so as to further inhibit false signals being generated from synchronous or wide-band interference.

The signal thus processed in the detecting means 40 is applied to the input of the EPROM 42. The EPROM 42 is programmed to provide a particular scanning code with a known relation to each marker response signal frequency. The scanning code signal corresponding to the detected response signal frequency of the marker 10 is then sent to the indicating means such as liquid crystal display 44 and displayed, for example, as a digital readout (note "AB3F" indicated on liquid crystal display in FIG. 1).

In accordance with the anti-counterfeiting objective of the present invention, a visible code indicia 46 is also attached to the product P to be protected. Preferably, the visible code indicia 46 is a series of digits printed or diplayed on the marker 10 secured to the product P (note, for example, "AB3F" shown on marker 10 in FIG. 1). The code indicia has a known relation to the response signal frequency of the marker, preferably a matching relationship, and a different indicia can be assigned for each manufacturer utilizing this anti-counterfeiting system. Thus, each manufacturer has its own individual code(s) but uses the same marker thus maximizing the use of the limited number of available response frequencies. For example, a marker 10 including a 33 kilohertz response frequency ribbon 16 could produce an indicated scanning code of "3271" for one manufacturer and a "43F6" for another. Consequently, the limited number of available ribbon response frequencies is no longer a problem.

Further, authenticity of a product P is now verified by means of an interactive process. Because of this, a prospective counterfeiter must surreptitiously acquire the complete system; i.e. not only a marker 10 with proper code indicia 46, must be stolen, but also a scanning unit 12 for the particular manufacturer programmed to indicate the proper scanning code. In this manner, the system is highly secure and safe from counterfeiters, but at the same time very economical to use.

As a further deterrent to counterfeiting, the scanning unit 12 may also be provided with means, such as a keypad 48, for changing the programming of the EPROM 42, thereby selectively altering the relation between the scanning code and the actual marker response frequencies. Thus, if a manufacturer becomes aware of a missing or stolen scanning unit 12, the manufacturer can alter the scanning units remaining in his possession to indicate a new and different scanning code in response to a given marker signal frequency. New labels with corresponding new indicia 46 may be provided on the markers 10.

Operation of the product verification system is summarized as follows. The first steps involve securing a verification marker 10 with a known response signal characteristic to the product P. As discussed above, the marker 10 produces an identifiable signal in response to an applied magnetic interrogation field. The product P prepared in this manner, is then shipped to an appropriate warehouse or retail outlet. There a field agent or other authorized personnel checks the products for authenticity.

The field agent utilizes the scanning unit 12 in establishing the interrogation field for application to the marker 10 attached to the product P. Then, after detecting the identifiable response signal from the marker 10, the scanning unit 12 indicates a random scanning code on the liquid crystal display 44.

The indicated random scanning code has a known relationship to the identifiable response signal frequency of the marker 10 and to an individual manufacturer. Thus, the authenticity of the product is verified by matching of the known code with the indicated scanning code from the scanning unit 12. Any discrepancy in the match of the known code and scanning code indicates that the products are counterfeit.

Each scanning unit 12 may be programmed to provide selective codes for different product verification system users. Advantageously, this serves to disguise the markers 10 and system technology as, for example, a 33 kilohertz frequency marker produces a different scanning code for each system user. Preferably, the scanning code is matched to a visible code indicia 46 printed directly on the marker 10.

In summary, numerous benefits result from employing the concepts of the present invention. By providing a distinctive marker 10 on the product and utilizing a scanning unit 12 programmed to indicate a random code, an interactive and disguised verification system is provided. Each distinctive ribbon 16 of the marker can be used for multiple manufacturers/products, thus substantially widening the system's applicability and minimizing the cost involved. This concept also greatly increases the effort necessary for a counterfeiter to bypass the system. Further, the provision of the distinctive random code printed visibly on the marker 10 allows a very efficient matching of codes.

The foregoing description of a preferred embodiment has been presented for purposes of illustration and description. It is not intended to be exhaustive or to limit the invention to the precise form disclosed. Obvious modifications or variations are possible in light of the above teachings. The embodiment was chosen and described simply to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A product verification system, comprising: a verification marker secured to the product that produces an identifiable signal in response to an applied interrogation field, said marker including an amorphous metal ribbon and said identifiable response signal being vibration frequency; and a matched scanning unit including:
   (a) means for establishing said applied interrogation field;
   (b) means for detecting and processing said response signal from said marker; and
   (c) means for indicating a scanning code having a known relationship with the identifiable response signal of said marker; said scanning code being random to disguise the response signal of the marker and being selected to match and have a known relationship to the response signal frequency of said marker; and
   (d) means to allow matching of said response signal to said scanning code for verification of the authenticity of said product.

2. The product verification system set forth in claim 1, wherein said matching means comprises a visible random code indicia on the product.

3. The product verification system set forth in claim 1, wherein said processing means includes an EPROM programmable for selected random scanning codes, thereby disguising said markers.

4. A method of product verification, comprising the steps of:
   securing a verification marker to the product, said marker including an amorphous metal ribbon having a vibration frequency that produces an identifiable response signal in response to an applied interrogation field;
   establishing the interrogation field for application to said marker;
   detecting the identifiable response signal of said marker;
   indicating a scanning code having a random but known relationship with the identifiable response signal of said marker, and being selected to match and have a known relationship to the response signal frequency of said marker; and verifying the authenticity of the product by matching the response signal to said scanning code.

5. The method of claim 4 wherein the step of indicating a scanning code includes programming for selected random scanning codes, thereby disguising said marker.

6. The method of claim 4 including the step of providing a visible code indicia on the product having a known relationship to the identifiable response signal of said marker for matching.

7. A product verification system, comprising: a verification marker secured to the product that produces an identifiable signal in response to an applied interrogation field, said marker including at least one ribbon of magnetostrictive, ferromagnetic material; and a matched scanning unit including:
   (a) means for establishing said applied interrogation field;
   (b) means for detecting and processing said response signal from said marker; and
   (c) means for indicating a scanning code having a known relationship with the identifiable response signal of said marker; said scanning code being random to disguise the response signal of the marker; and
   (d) means to allow matching of said response signal to said scanning code verification of the authenticity of said product, said matching means comprising a visible random code indicia on the product.

8. The product verification system set forth in claim 7, wherein said processing means includes an EPROM programmable for selected random scanning codes, thereby disguising said markers.

* * * * *